No. 829,061. PATENTED AUG. 21, 1906.
S. K. DENNIS & F. W. RICE.
REEL ADJUSTING MECHANISM FOR HARVESTERS.
APPLICATION FILED DEC. 26, 1905.
3 SHEETS—SHEET 1.
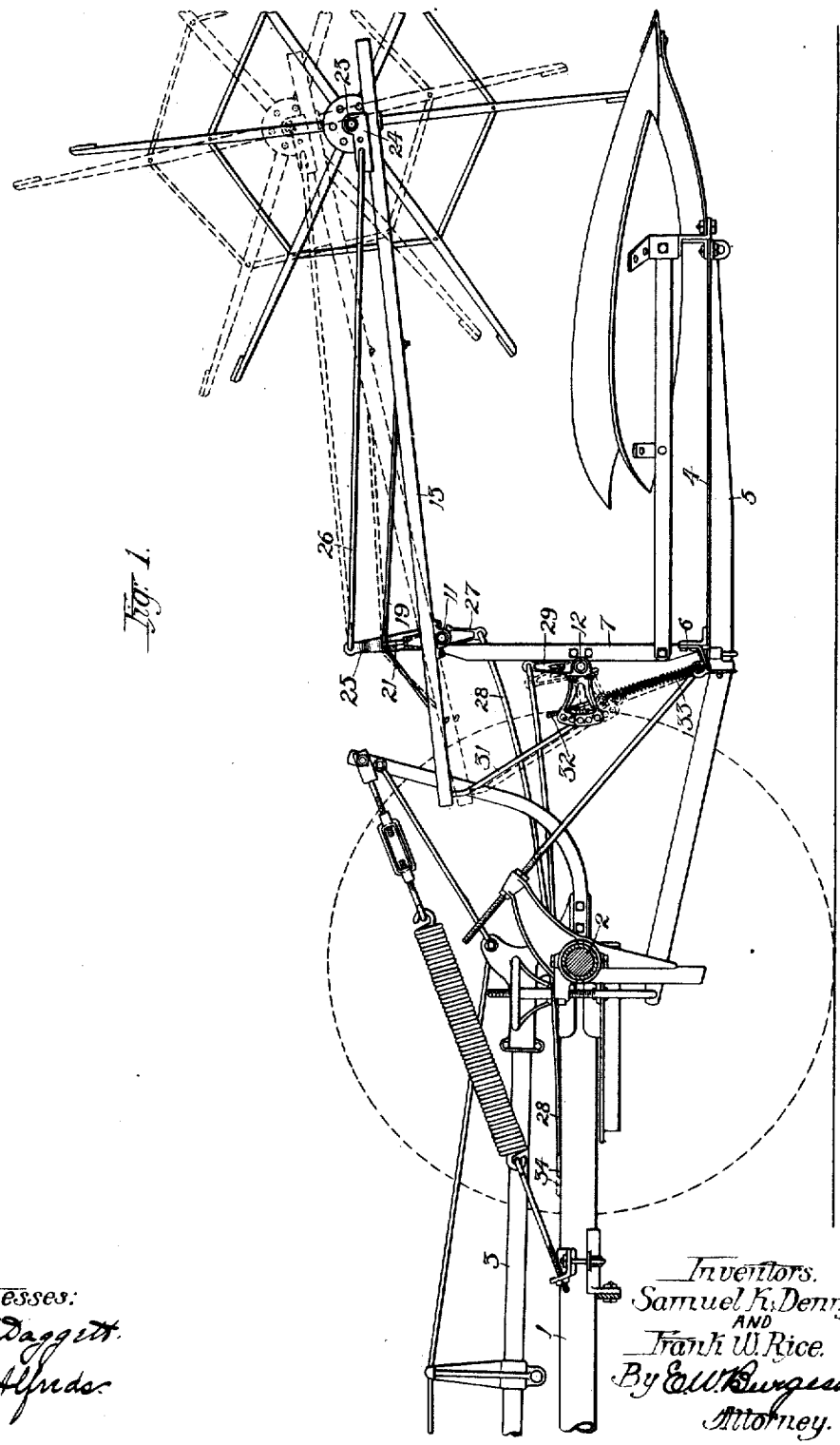

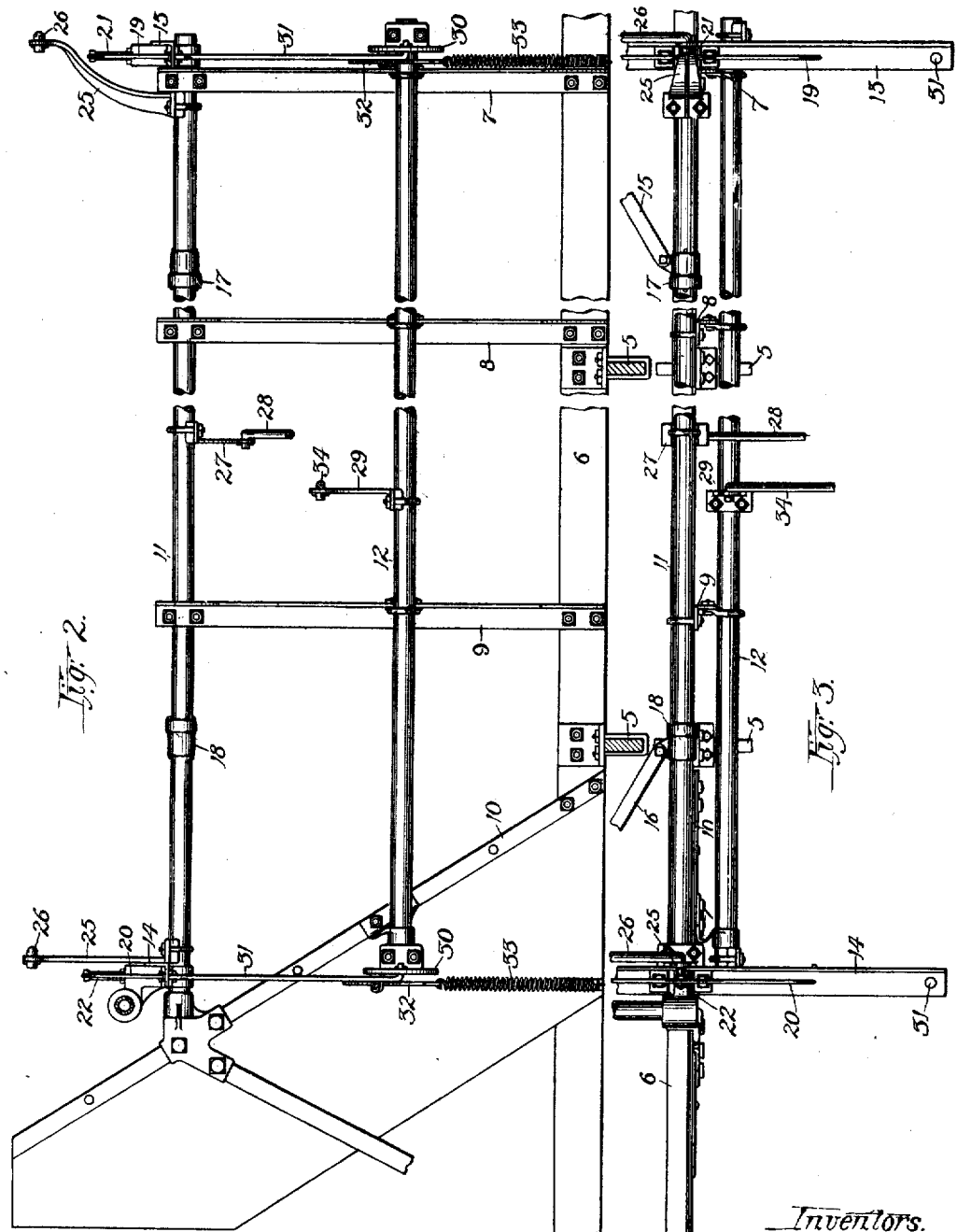

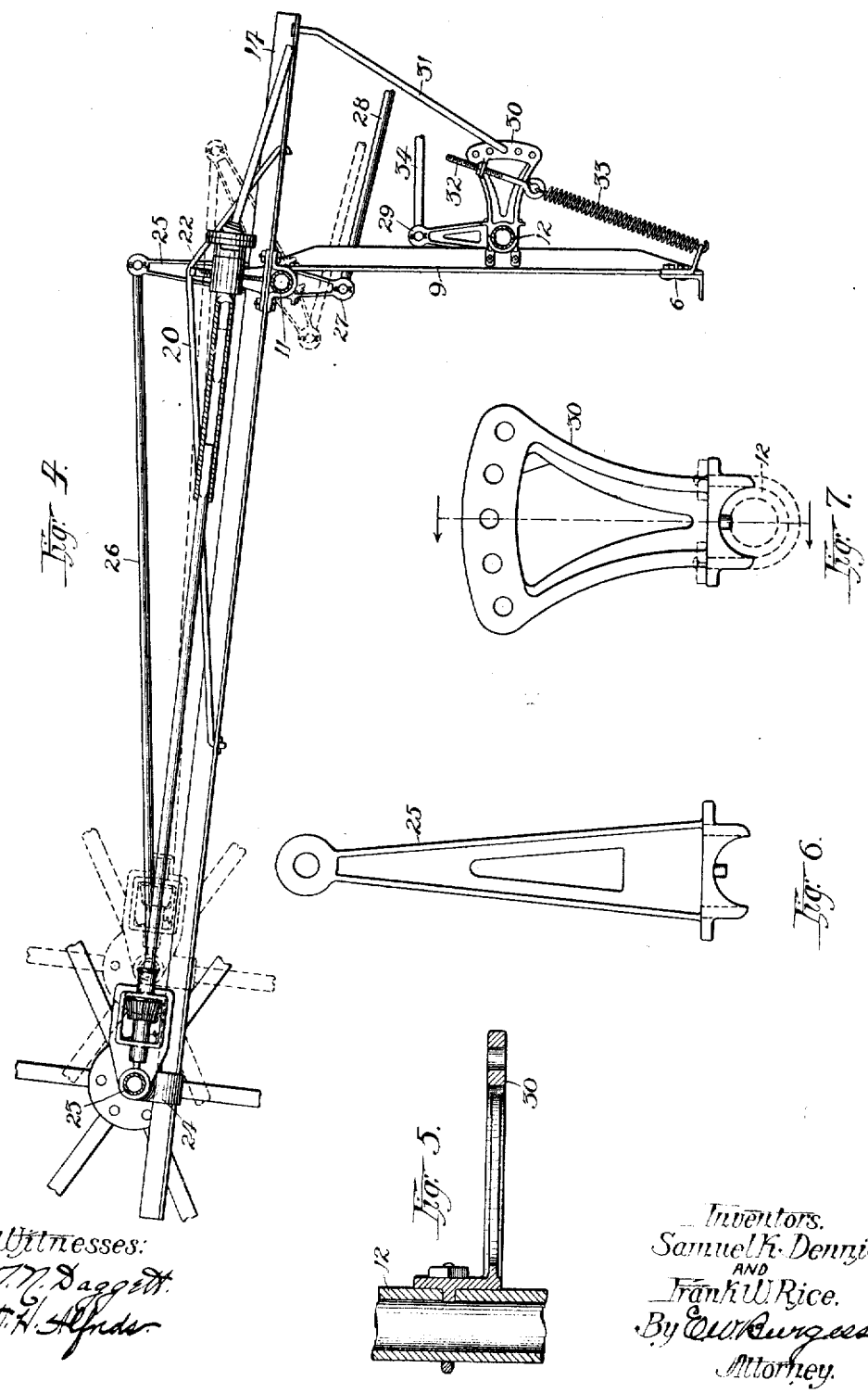

UNITED STATES PATENT OFFICE.

SAMUEL K. DENNIS AND FRANK W. RICE, OF CHICAGO, ILLINOIS, ASSIGNORS TO INTERNATIONAL HARVESTER COMPANY, A CORPORATION OF NEW JERSEY.

REEL-ADJUSTING MECHANISM FOR HARVESTERS.

No. 829,061.     Specification of Letters Patent.     Patented Aug. 21, 1906.

Application filed December 26, 1905. Serial No. 293,177.

*To all whom it may concern:*

Be it known that we, SAMUEL K. DENNIS and FRANK W. RICE, citizens of the United States, residing at Chicago, in the county of Cook and State of Illinois, have invented certain new and useful Improvements in Reel-Adjusting Mechanism for Harvesters, of which the following is a specification, reference being had to the accompanying drawings, forming a part thereof.

Our invention relates to reel-adjusting mechanism for harvesters, its object being to provide a simple, strong, and effective construction having operative means designed to positively adjust the reel to the various positions in which it may be operated, and the mechanism is particularly designed and applicable for use in connection with that type of harvesters in which the propelling means comprises what is commonly called a "push-pole," upon which are mounted various hand-operated levers having connections with the operative parts of the machine, which are not shown and may be any of the usual forms, as preferred.

In the accompanying drawings, Figure 1 is an end view of the reel-adjusting mechanism and as much of a harvester thought to be sufficient to illustrate the application of our invention. Fig. 2 is a rear view of a part of the adjusting mechanism. Fig. 3 is a top plan view of part of Fig. 2. Fig. 4 is a partial side elevation of the adjusting means, and Figs. 5, 6, and 7 represent details of various parts.

The same reference characters represent similar parts throughout the several views.

The wheel-frame of the harvester comprises a push-pole 1, suitably connected at its forward end with an axle 2, and 3 is a tilting lever secured to the axle and adapted to rock it about its axis in a well-known way.

4 is the grain-platform, having rearwardly-extending frame members 5 connected with the axle and supported thereby. Secured to the rear sill 6 of the grain-platform are vertically-arranged posts 7, 8, and 9 and a part 10, forming a portion of the elevator-frame, and mounted thereon in a manner to be rocked about their axes are the tubular pipes 11 and 12 at the upper ends and near the center of the posts, respectively.

Mounted upon the pipe 11, near opposite ends thereof, are angle-bars 13 and 14, extending forwardly and rearwardly therefrom and adapted to rock thereon, and lateral braces 15 and 16 have their rear ends secured to the pipe 11 by means of the sleeves 17 and 18, loosely embracing the pipe, and their forward ends may be secured in any manner to the forwardly-extending ends of the angle-bars 13 and 14 and operate to hold the bars in correct angular relation with the pipe, and truss-rods 19 and 20 in combination with suitable struts 21 and 22, forming a part of the connection between the angle-bars and the pipe, operate as supplemental supports for the extended ends of the bars.

Mounted upon the forward ends of the angle-bars is a reel supporting and driving shaft 23, adapted to move in a fore and aft direction thereon by means of the journal-boxes 24, having slidable connection therewith. Secured to the pipe 11, near opposite ends thereof, are levers 25, and 26 represents links pivotally connecting the outer ends of the levers with the slidable journal-boxes, and near the central part of the pipe is secured a lever 27, having one end of a link 28 pivotally connected with the outer end thereof, and the opposite end of the link may be connected with any of the common forms of hand-operated levers located at the rear end of the push-pole and convenient to the hand of the operator for the purpose of rocking the pipe 11 upon its axis, and thereby adjusting the reel through its connections with the pipe in a fore and aft direction relative to the grain-platform.

Secured to the pipe 12 near its central portion is an upwardly-extending lever 29, and near opposite ends of the pipe are secured rearwardly-extending levers 30, having a series of openings at their outer ends concentrically arranged relative to the axis of the pipe, and 31 represents links pivotally connected with the rearwardly-extended ends of the angle-bars 13 and 14 and the levers 30, the series of openings therein providing means for adjusting the connection between the pipe and said angle-bars. Adjustably secured to the levers 30 by means of the threaded links 32 are counterbalancing-springs 33, that have their opposite ends secured to a fixed part of the grain-platform and operate to counterpoise the weight of the forward ends of the reel-supporting bars and attached reel. Pivotally connected with the outer end of the lever 29 is a link 34, which may have its opposite end connected to any of the well-known forms of hand-operated levers, that may be mounted on the pole convenient to the hand of the operator. The pipes 11 and 12 may be rocked independently in either direction by applying force to the respective links connected to the operating-levers secured thereto. When the pipe 11 is rocked, it communicates motion to move the reel in a fore and aft direction, and if the pipe 12 be rocked in its bearings it operates to raise or depress the reel-carrying arms and cause the reel to assume a higher or lower plane.

What we claim as our invention, and desire to secure by Letters Patent, is—

1. In a reel-adjusting mechanism for harvesters, the combination of a grain-platform having vertically-arranged frame members secured to the rear side thereof, a rock-shaft mounted in bearings secured at the upper ends of said frame members, reel-supporting bars mounted at opposite ends of said rock-shaft extending forward and rearward therefrom and adapted to rock about its axis, a reel-shaft slidably mounted upon the forward ends of said bars, arms secured to said rock-shaft and connected with said reel-shaft in a manner to move said reel-shaft in a fore or aft direction when said rock-shaft is rocked in its bearings, and a second rock-shaft mounted near the central portion of said frame members, having arms secured thereto and said arms having a link connection with the rear ends thereof said reel-supporting bars in a manner to rock said bars about their bearings when said rock-shaft is operated.

2. In a reel-adjusting mechanism for harvesters, the combination of a grain-platform having vertically-arranged frame members secured to the rear side thereof, bearings secured to said frame members near the upper ends thereof at opposite ends of said platform, reel-supporting bars mounted on said bearings and adapted to rock thereon and extending rearward and forward therefrom, said bars having a reel-supporting shaft mounted in bearings at their forward ends, a rock-shaft mounted in bearings secured to said vertically-arranged frame members, arms secured to said rock-shaft near opposite ends thereof, link connections between said arms and the rear ends of said bars, and counterbalancing-springs having one end secured to a fixed part of the platform and their opposite ends connected with said arms in a manner to operate as a counterpoise for the weight of the reel mechanism.

3. In a reel-adjusting mechanism for harvesters, the combination of a grain-platform having vertically-arranged frame members secured to the rear side thereof, bearings secured to said frame members near the upper ends thereof at opposite ends of said platform, reel-supporting bars mounted on said bearings and adapted to rock thereon and extending rearward and forward therefrom, said bars having a reel-supporting shaft mounted in bearings at their forward ends, a rock-shaft mounted in bearings secured to said vertically-arranged frame members, arms secured to said rock-shaft near opposite ends thereof, said arms having a series of openings concentrically arranged relatively to the axis of the shaft, links adapted to engage with said openings and connect said arms with the rear ends of said reel-supporting bars, and counterbalancing-springs having one end secured to a fixed part of the platform and their opposite ends adjustably connected with said arms.

In witness whereof we hereto affix our signatures in presence of two witnesses.

SAMUEL K. DENNIS.
FRANK W. RICE.

Witnesses:
 TINE N. DAGGETT,
 F. H. ALFREDS.